United States Patent
Little (10) Patent No.: US 7,263,945 B2
(45) Date of Patent: Sep. 4, 2007

(54) PONTOON FOR WATERCRAFT (76) Inventor: Rolland N. Little, 3960 Chamberer Dr., San Jose, CA (US) 95135

( * ) Notice: Subject to any disclaimer, the term of this patent is extended or adjusted under 35 U.S.C. 154(b) by 0 days.

(21) Appl. No.: 11/356,458

(22) Filed: Feb. 17, 2006

(65) Prior Publication Data

US 2006/0191463 A1 Aug. 31, 2006

Related U.S. Application Data (63) Continuation-in-part of application No. 10/601,830, filed on Jun. 23, 2003, now Pat. No. 7,047,902.

(60) Provisional application No. 60/390,127, filed on Jun. 21, 2002.

(51) Int. Cl.
 *B63B 1/00* (2006.01)

(52) U.S. Cl. ..................... 114/292; 114/61.1

(58) Field of Classification Search ............... None
See application file for complete search history.

(56) References Cited

U.S. PATENT DOCUMENTS

| 3,090,339 | A |   | 5/1963  | Carr |
|-----------|---|---|---------|------|
| 4,804,140 | A |   | 2/1989  | Cantrell |
| 4,991,532 | A |   | 2/1991  | Locke |
| 5,016,558 | A |   | 5/1991  | Oehler |
| 5,074,811 | A |   | 12/1991 | Crisman |
| 5,131,341 | A |   | 7/1992  | Newman |
| 5,131,888 | A |   | 7/1992  | Adkins, II |
| 5,197,291 | A |   | 3/1993  | Levinson |
| 5,221,891 | A |   | 6/1993  | Janda et al. |
| 5,236,378 | A |   | 8/1993  | Newman |
| 5,280,133 | A |   | 1/1994  | Nath |
| 5,289,999 | A |   | 3/1994  | Naujeck et al. |
| 5,524,564 | A | * | 6/1996  | Porada ................ 114/61.1 |
| 5,567,188 | A | * | 10/1996 | Allebosch ............ 114/61.1 |
| 5,725,062 | A |   | 3/1998  | Fronek |
| 5,787,833 | A |   | 8/1998  | Lewis |
| 5,931,114 | A |   | 8/1999  | Bartholomew |
| 6,000,353 | A |   | 12/1999 | De Leu |
| 6,021,862 | A |   | 2/2000  | Sharan |
| 6,073,569 | A |   | 6/2000  | Motsenbacker et al. |
| 6,105,524 | A |   | 8/2000  | Dane |
| 6,263,826 | B1 |  | 7/2001  | Key |
| 6,273,015 | B1 |  | 8/2001  | Motsenbacker et al. |
| 6,747,363 | B2 |  | 6/2004  | Sanchez Gomez |
| 2001/0032574 | A1 | * | 10/2001 | Newton et al. ......... 114/61.1 |

* cited by examiner

FOREIGN PATENT DOCUMENTS

GB  2 234 723 A  2/1991

*Primary Examiner*—Lars A. Olson
(74) *Attorney, Agent, or Firm*—Edell, Shapiro & Finnan LLC (57) ABSTRACT

The present invention is directed toward a motorized watercraft. The watercraft includes a pontoon section, a strut section, a deck section, and an optional a canopy section. The pontoon section includes a pontoon to which a housing capable of storing an object is coupled. The pontoon includes a receptacle that mates with the housing. The receptacle may include a recess formed in the surface of the pontoon that receives the housing. Alternatively, the receptacle may include an opening that enables the housing to be partially inserted into the pontoon. In another embodiment, the housing may be secured to the exterior surface of the pontoon. The housing extends from pontoon and either terminates such that it is generally flush with the surface of the deck, or may extend through the deck surface. The housing permits a user to selectively access the object from the deck.

20 Claims, 11 Drawing Sheets

PONTOON FOR WATERCRAFT

CROSS REFERENCE TO RELATED APPLICATIONS

This application is a continuation-in-part of U.S. patent application Ser. No. 10/601,830 filed 23 Jun. 2003 now U.S. Pat. No. 7,047,902 and entitled "Solar Charged, Electrically Driven Watercraft", which claims priority from U.S. Provisional Patent Application Ser. No. 60/390,127, entitled "Solar Boat Cooling and Exhaust System" and filed 21 Jun. 2002. The disclosures of the above-mentioned applications are incorporated herein by reference in their entireties.

FIELD OF THE INVENTION

The present invention is directed toward a pontoon for a watercraft and, in particular, to a pontoon including an integrated housing for storing an object.

BACKGROUND OF THE INVENTION

Small water vehicles such as pontoon boats are commonly used for recreational and business purposes in rivers and lakes. A pontoon boat includes a passenger compartment or platform set on elongated floats called pontoons. A motor is positioned between the pontoons. The pontoon boat relies on the large flotation capacity of the pontoons to provide buoyancy and stability to the watercraft—the pontoon surfaces both absorb and generate waves, permitting large loads and travel across turbulent water.

Pontoon water vehicles may be gas powered or electrically powered. Originally, electric engines were more reliable than gasoline engines; however, the technology of gas engines improved at a faster rate, providing more horsepower and reliability than electric engines. Eventually, the state of the art was such that electric engines could not compete with gasoline engines. Unfortunately, the success of gasoline powered boating has brought environmental damage to the very waters and ecosystems that support the enterprise. Environmental repair to water and areas of boating has been accommodated by the removal or restriction of gasoline powered boats and the promotion of electric boats.

Electrically driven water vehicles, however, still present engineering challenges. Electric boat motors consume large amounts of DC power to move a load over water, so large battery packs are required for their operation. To compensate for this size, battery packs have traditionally been placed on the deck of the vehicle. Doing so provides ample space for large packs; however, this creates a craft having a high center of gravity, which affects the trim (equilibrium) of the craft. In addition, situating battery storage on the deck not only restricts passenger activity (since it takes up a large portion of the deck area), but also makes the battery easily accessible by passengers. Since electrically driven boats require the use of AC/DC electrical wires on or near the water for recharging, storing batteries on a deck risks serious injury to passengers (e.g., electrocution or serious burns caused by passengers accessing the batteries). Consequently, there is a need to provide a watercraft that can accommodate large battery loads, free up deck space, and limit the accessibility of the battery storage area to passengers.

One approach to addressing these concerns is shown in U.S. Pat. No. 6,000,353 (De Leu). De Leu discloses a recreational raft having a hand-controlled steering mechanism and solar cells for powering an outboard electric motor. A chair forms a raft interconnecting a pair of sponsons to each other. Each sponson extends outward from a side of the chair. The sponsons have flat, upward facing surfaces each including a photovoltaic cell connected to a control panel. An optional battery is encased within one sponson. An electric propeller motor, positioned rearward of the chair, is supported by a tube attached between the rear of the sponsons.

U.S. Pat. No. 6,073,569 (Motsenbacker et al.) discloses an electric powered watercraft comprising a power mass completely enclosed in a support member that further includes the motor. The support member is mostly or completely submerged in the water. The watercraft further includes at least one floating ski configured to skip along the surface of the water, providing buoyancy to the watercraft. A platform is spaced above the support member and ski(s) using struts.

Both of the above approaches suffer from several disadvantages. The sponsons of the single person raft of DeLeu are positioned laterally from the passenger seat. As a result, should the raft contact side-rolling waves, the raft will become unstable, making it unsuitable for open waters. DeLeu, moreover, requires the battery source to be completely enclosed within the sponson, limiting access thereto. Any corrosive gasses or chemicals released by the battery would corrode and destroy the sponson, requiring its replacement. The enclosed power source, furthermore, must remain small—enclosing a larger weight (i.e., a larger battery) within either sponson creates additional raft instability.

Motsenbacker et al., while enabling access to open waters, similarly requires its battery source to be completely enclosed within the support member. This not only prevents access to the power source from the deck, but any corrosive gasses or chemicals released by the battery would corrode and destroy the support member, requiring its replacement. In addition, the support member is mostly or completely submerged during use; consequently, a user must dry dock the watercraft to repair or replace components in the support member, since repair during use is impossible.

Consequently, there exists a need to provide a watercraft suitable for open waters including a flotation structure that provides a user access to the battery source, as well as provides increased watercraft stability.

SUMMARY OF THE INVENTION

The present invention is directed toward a motorized water vehicle and, in particular, to an electrically driven watercraft. The watercraft includes a pontoon section, a strut section, a deck section, and an optional canopy section. The pontoon section comprises a pontoon adapted to store an object such as a battery. Specifically, a housing operable to store an object is coupled to the pontoon. In one embodiment, the pontoon includes a receptacle that mates with the housing. The receptacle may comprise a recess within the surface of the pontoon that receives the housing. Alternatively, the receptacle may comprise an opening that enables the housing to be partially inserted into the pontoon. In another embodiment, the housing may be secured to the exterior surface of the pontoon. The housing extends from pontoon and either terminates such that it is generally flush with the surface of the deck, or may extend through the deck surface.

BRIEF DESCRIPTION OF THE DRAWINGS

Like reference numerals in the various figures are utilized to designate like components.

DETAILED DESCRIPTION OF THE PREFERRED EMBODIMENTS

Figure 1:
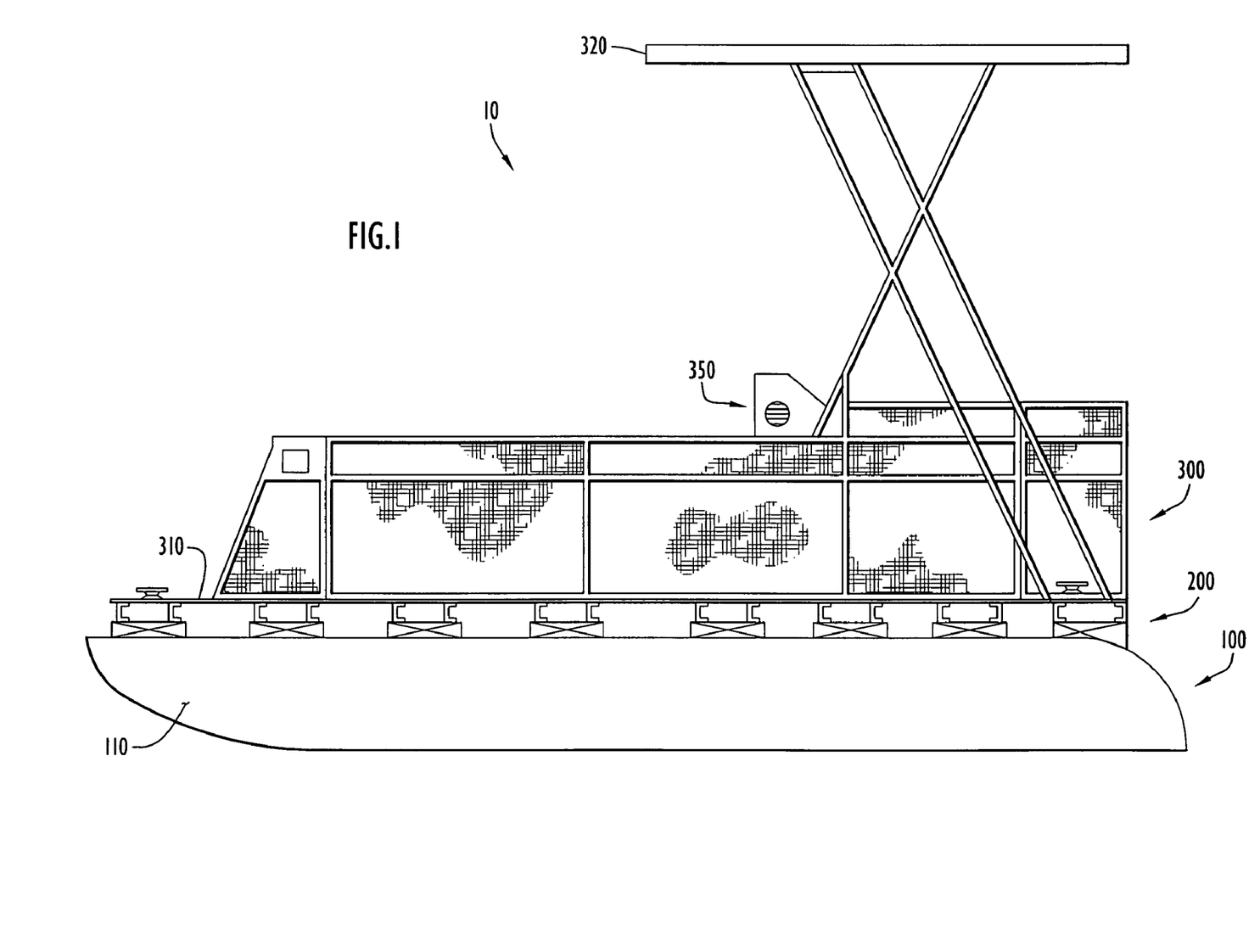
FIG. 1 is a side view in elevation of the general structure of the watercraft according to an embodiment of the invention.

FIG. 1 is a perspective view of a watercraft according to an embodiment of the invention. As shown, the watercraft 10 generally comprises a pontoon section 100, a strut section 200, and a platform or deck section 300 including a deck 310 and a canopy 320. The pontoon section 100 includes at least one pontoon member or body 110 operable to buoy the watercraft 10 on water. By way of example, the pontoon 110 may comprise a hollow, generally tubular structure formed from buoyant material (e.g., aluminum). The internal space of the pontoon 110 essentially comprises a channel filled with air, which aids its buoyancy. The number of pontoons 110 comprising the pontoon section 100 is not particularly limited, and depends on the desired deck size, the intended passenger/load weight, and the desired traveling speed. By way of specific example, the pontoon section 100 may comprise two pontoons 110. Two pontoons serve to minimize the effect of drag on a moving watercraft 10, as well as enhance the stability of the craft.

Figure 2:
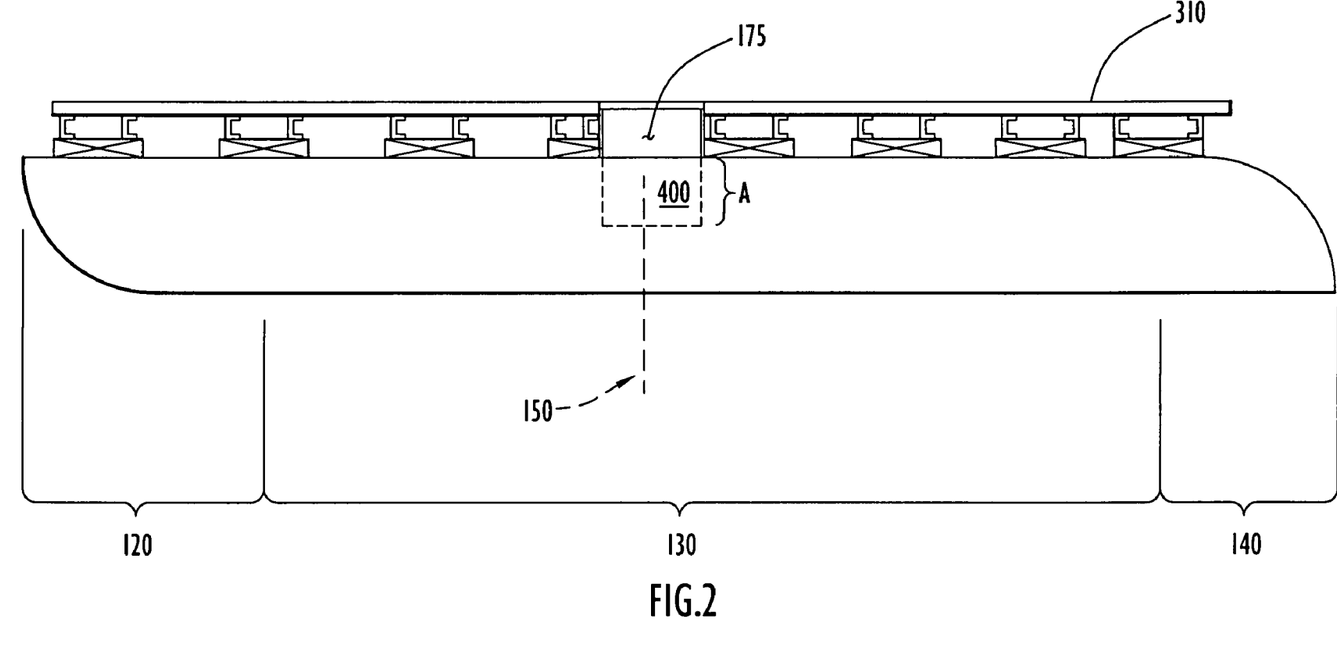
FIG. 2 is an isolated, side view of the pontoon and deck sections of the watercraft of FIG. 1, showing the relationship of the housing to the deck.

The shape and dimensions of the pontoon 110 are not particularly limited. By way of example, the pontoon 110 may possess either a rounded or U-shaped configuration. Referring to FIG. 2, the pontoon 110 may include a forward (fore) portion 120, an intermediate portion 130, and a rear (aft) portion 140. The intermediate portion 130 includes the pontoon's flotation centerline 150. The position of the flotation centerline 150 is not particularly limited, and varies according to the weight displacement exerted on the pontoon section 100 (e.g., the deck and related components). By way of specific example, the flotation centerline 150 may be generally located halfway between the fore section point where the diameter is 75% of the full pontoon diameter and an aft section point where the diameter is equal to or greater than 80% of the full pontoon diameter.

As noted above, a pontoon 110 may comprise a generally hollow structure having a generally rounded cross section. Alternatively, the pontoon may comprise a generally U-shaped cross section (where the flat surface of the "U" is oriented toward the 310). The intermediate portion 130 may have the same cross sectional shape as the fore and aft portions 120, 140, or may possess a different cross sectional shape. For example, the pontoon may comprise a generally rounded shape, while the shape of the fore and aft portions 120, 140 may have a taper configured to reduce the effects of drag that occur as the pontoons 110 travel along the water. By way of specific example, the exterior surface of the fore and aft portions 120, 140 may taper upward (toward the deck 310) to resemble the right-side-up bow of a canoe. Alternatively, one of the portions 120, 140 (e.g., the aft portion 140) may taper rearward and/or downward. The placement of the flotation centerline 150, as well as the tapering of the pontoon 110 is more fully disclosed in U.S. patent application Ser. No. 10/601,830, incorporated by reference above in its entirety.

Figure 3A:
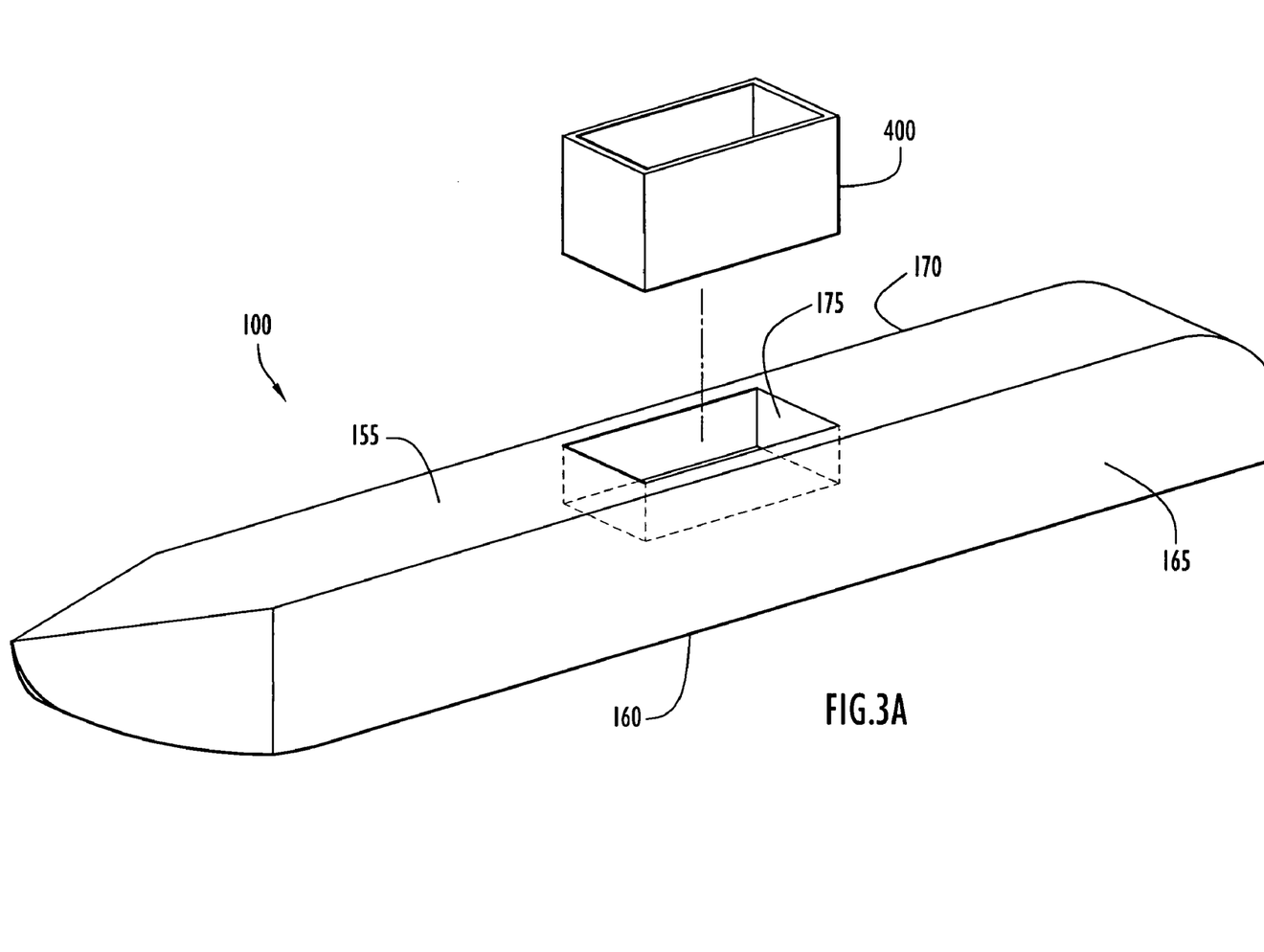
FIGS. 3A and 3B illustrate perspective views of a pontoon according to another embodiment of the invention, showing a recessed receptacle configuration.
Figure 3B:
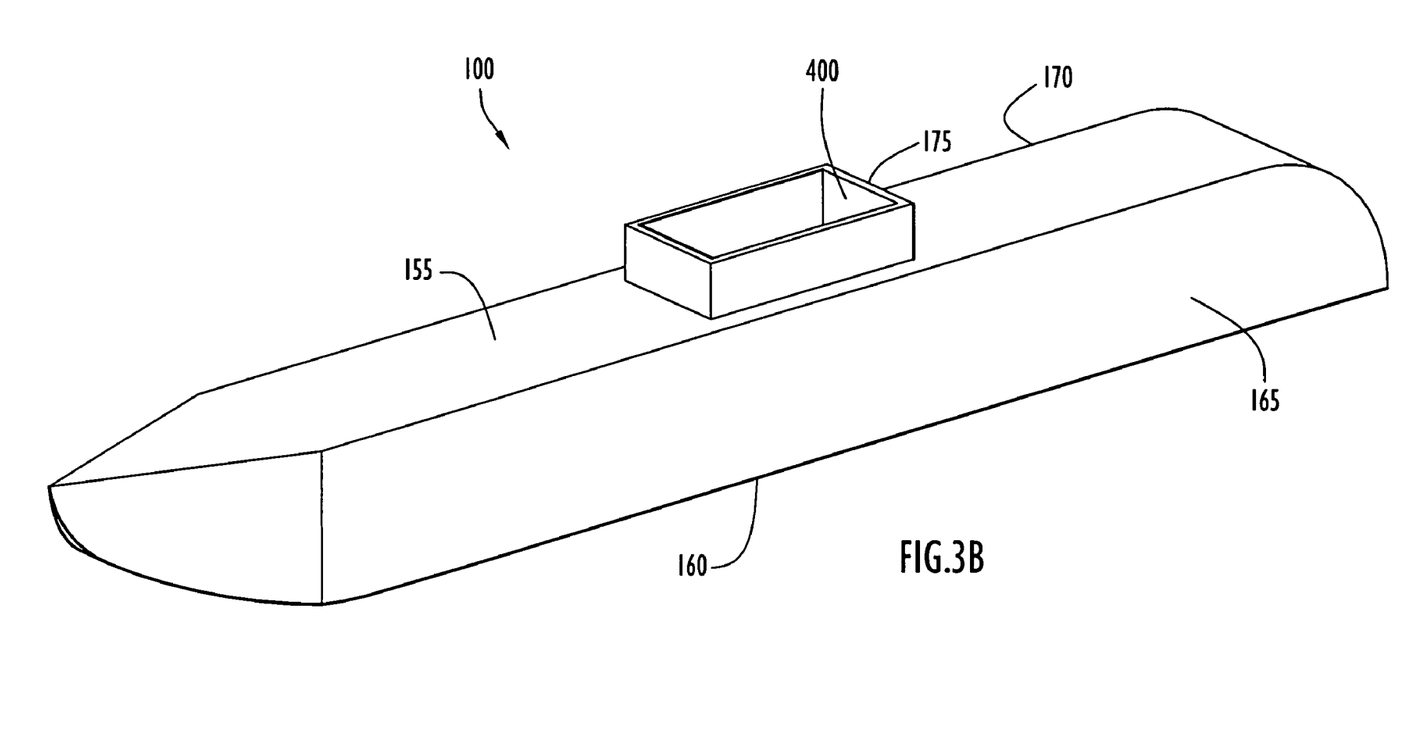
Figure 4A:
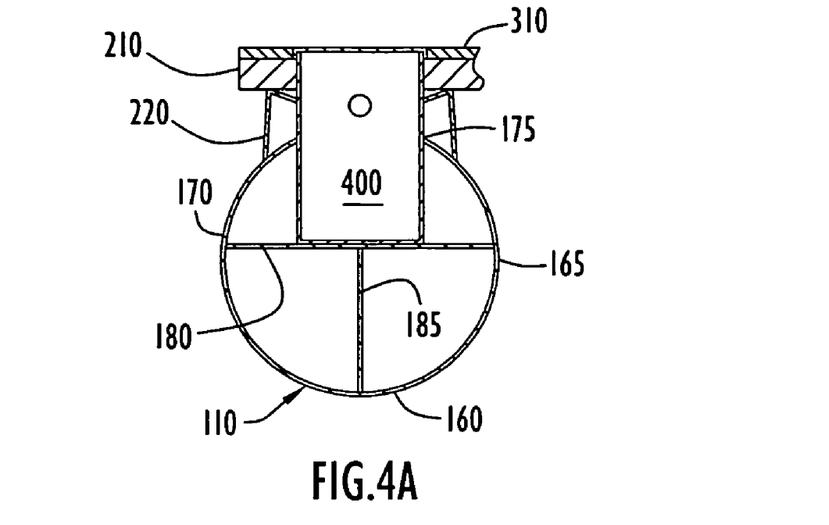
FIGS. 4A and 4B illustrate front views of a pontoon suspended from the deck section, showing a pontoon with a receptacle opening.
Figure 4B:
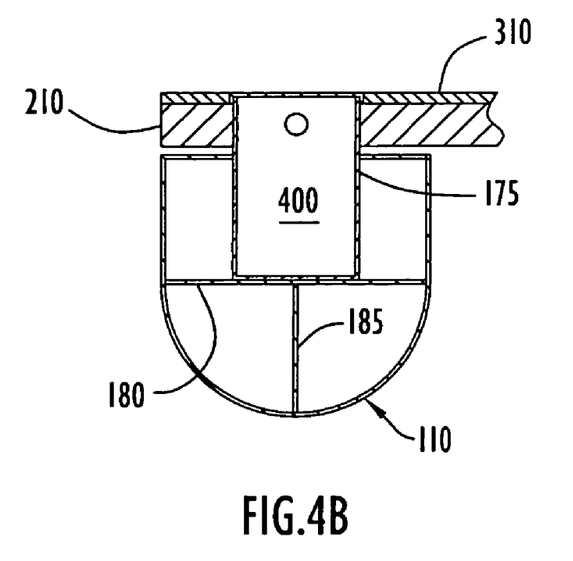
Figure 5A:
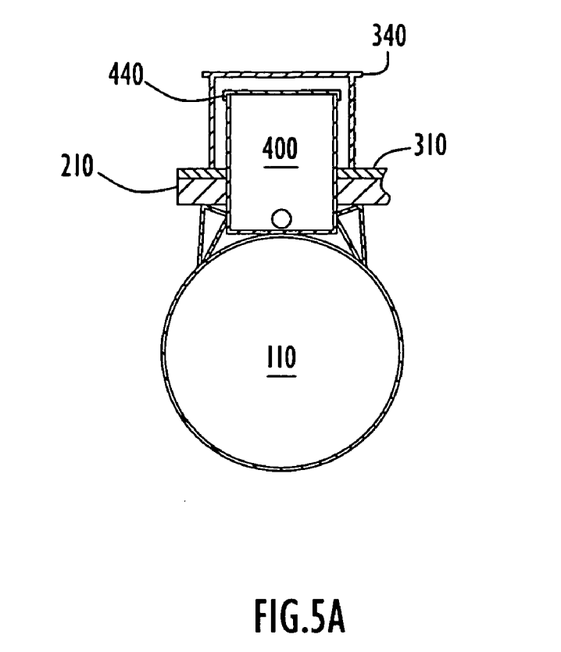
FIGS. 5A and 5B illustrate front views of a pontoon suspended from the deck section, showing an external mounting configuration.
Figure 5B:
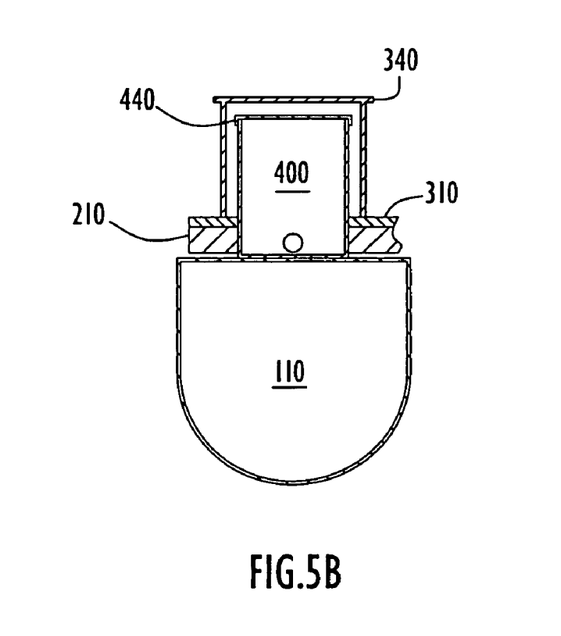

The pontoon 110 is coupled to a housing or container 400 configured to store an object. FIGS. 3-5 illustrate mounting configurations according to embodiments of the invention. As shown, the housing 400 may be mounted internally, wherein the housing extends transversely into the pontoon 110, or may be mounted externally, wherein the housing 400 extends from the surface of the pontoon 110. The housing 400 may be secured to the pontoon 110 in any manner that maintains a fluid tight relationship between the housing and the pontoon. By way of example, the housing 400 may be welded to the pontoon 110. Alternatively, fasteners, gaskets, and/or waterproof adhesives and/or sealants may be utilized. In addition, the housing 400 may be formed integral with the pontoon 110. The size and shape of the housing 400 is not particularly limited, and includes polygon and round shapes. The housing 400 may be formed from material that is the same as or different from the material forming the pontoon. For example, the housing 400 may comprise a lightweight material such as aluminum or plastic.

FIGS. 3A and 3B are perspective views of the pontoon 110 in isolation. The pontoon 110 comprises an upper wall 155, a lower wall 160, a first side wall 165, and a second side wall 170. A receptacle or cavity 175 is formed in the upper wall 155 of the pontoon 110. The receptacle 175 is adapted to receive the housing 400 and secure it to the pontoon in a fluid tight manner. For example, the receptacle 175 may comprise a depression or recess extending downward toward the lower pontoon wall 160 (i.e., it extends transversely into the hollow portion of the pontoon 110). Alternatively, the receptacle 175 may comprise an aperture or opening cut into the pontoon 110, which permits the housing 400 to pass into its interior space and extend at least partially into the pontoon's hollow interior channel.

The receptacle 175 may be any size and shape suitable for its described function. Typically, the receptacle 175 is contoured similarly to the perimeter of the housing 400. As shown in FIG. 3, the receptacle 175 may comprise a generally rectangular recess including a floor and side walls that define a cavity with a diameter slightly larger than the diameter of the housing 400. The recess is configured to mate with the generally rectangular housing 400, which, when inserted into the recess, is supported by the recess floor. The depth of the recess is not particularly limited. By way of example, the recess may have a depth configured to permit the housing 400 to extend upward, beyond the perimeter of the pontoon 110, and terminate proximate the deck 310 of the watercraft 10. By way of specific example, the depth of the recess may equal from about ½ to about ¾ the cross sectional diameter of the pontoon 110.

The receptacle 175 may also be configured as an aperture or opening that permits the housing 400 to extend at least partially into the interior space of the pontoon 110. FIGS. 4A and 4B illustrate front views of a pontoon 110 and deck 310, showing a rounded pontoon shape (FIG. 4A) and a U-shaped pontoon (FIG. 4B). In this embodiment, the housing 400 may be set within the interior space of the pontoon 110 at the desired depth. A support plate 180 supports the housing 400, positioning the housing 400 at the desired depth within the pontoon 110. The support plate 180 may be secured to the interior surfaces of the pontoon side walls 165, 170. A vertical support or brace 185 may also be used to provide additional support to the plate 180. The brace 185 may extend from the lower wall 160 of the pontoon 110 to the bottom surface of the support plate 180. The support plate 180 and brace 185 may be secured to the pontoon 110 using conventional fasteners, welding, etc. The support plate 180 and the brace 185 may be formed from the same or different material as that of the pontoon 110. By way of example, the plate 180 and/or brace 185 may comprise aluminum having a thickness of about ¼ inch.

The depth the support plate 180 is positioned within the pontoon 110 is not particularly limited, and may be adjusted to accommodate housings 400 of various sizes. Preferably, the plate 180 is set at a depth that allows the housing 400 to extend beyond the periphery of the pontoon 110 and terminate proximate the surface of the deck 310 (i.e., the depth may equal the height of the housing 400, less the distance measured from the deck to the external surface of the pontoon 110). In FIG. 2, this distance is illustrated as distance A. By way of example, the depth of the plate 180 may equal about ½ to about ¾ the total cross sectional diameter of the pontoon 110. As described above with the regard to the recess, the dimensions (e.g., diameter) of the housing 400 are slightly smaller (e.g., less than about ½ inch smaller) than the pontoon opening. The housing 400 may be secured to pontoon 110 in a fluid tight manner, e.g., welding, waterproof adhesives or sealants, etc. Alternatively, the housing may be formed integral with the pontoon 110.

FIGS. 5A and 5B illustrate front views of the pontoon body 110 of FIG. 2, showing the external mounting configuration according to embodiments of the present invention. Specifically, FIG. 5A illustrates the housing 400 mounted on the exterior of a pontoon 110 having a generally round shape and FIG. 5B illustrates the housing 400 mounted on the exterior of a generally U-shaped (flat-topped) pontoon. As shown, the pontoon 110 surface is continuous—the receptacle 175 is not formed into the pontoon 110. The housing 400, moreover, is mounted to the exterior surface of the pontoon 110 such that the entire housing 400. In the external mounting configuration, the housing 400 typically sets higher with respect to the deck 310 when compared to the internal mounting configuration. Specifically, the housing 400 may protrude through the deck 310 of the watercraft 10. As a result, a cover 340 may be positioned over the portion of the housing protruding above the deck 310, concealing the portion. By way of example, the housing 400 may be concealed by a furniture item such as a bench. The housing 400 may be coupled to the exterior of the pontoon using conventional fasteners, welding, etc. Alternatively, the housing 400 may be formed integral with the pontoon 110.

The housing 400 may be positioned along the pontoon 110 at any desired point, regardless of the mounting configuration (internal or external). By way of example, the housing 400 may be placed proximate the pontoon's centerline of flotation 150. By way of specific example, when the housing 400 is rectangular, the housing may be positioned over the centerline of flotation 150 such that the receptacle 175 is slightly off longitudinal center, being oriented slightly closer to the rear of the pontoon. When a plurality of pontoons 110 is present, all or a portion of the pontoons may be provided with the housing 400. The housings, moreover, may be externally and/or internally mounted on the pontoon. Preferably, when a plurality of pontoons that make up a pontoon section 100 each includes the housing 400, the same mounting configuration is used (e.g., all internal mounting or all external mounting). This, however, is not required. In addition, it is important to note that a pontoon 110 may include multiple housings 400 mounted thereon.

Figure 6:
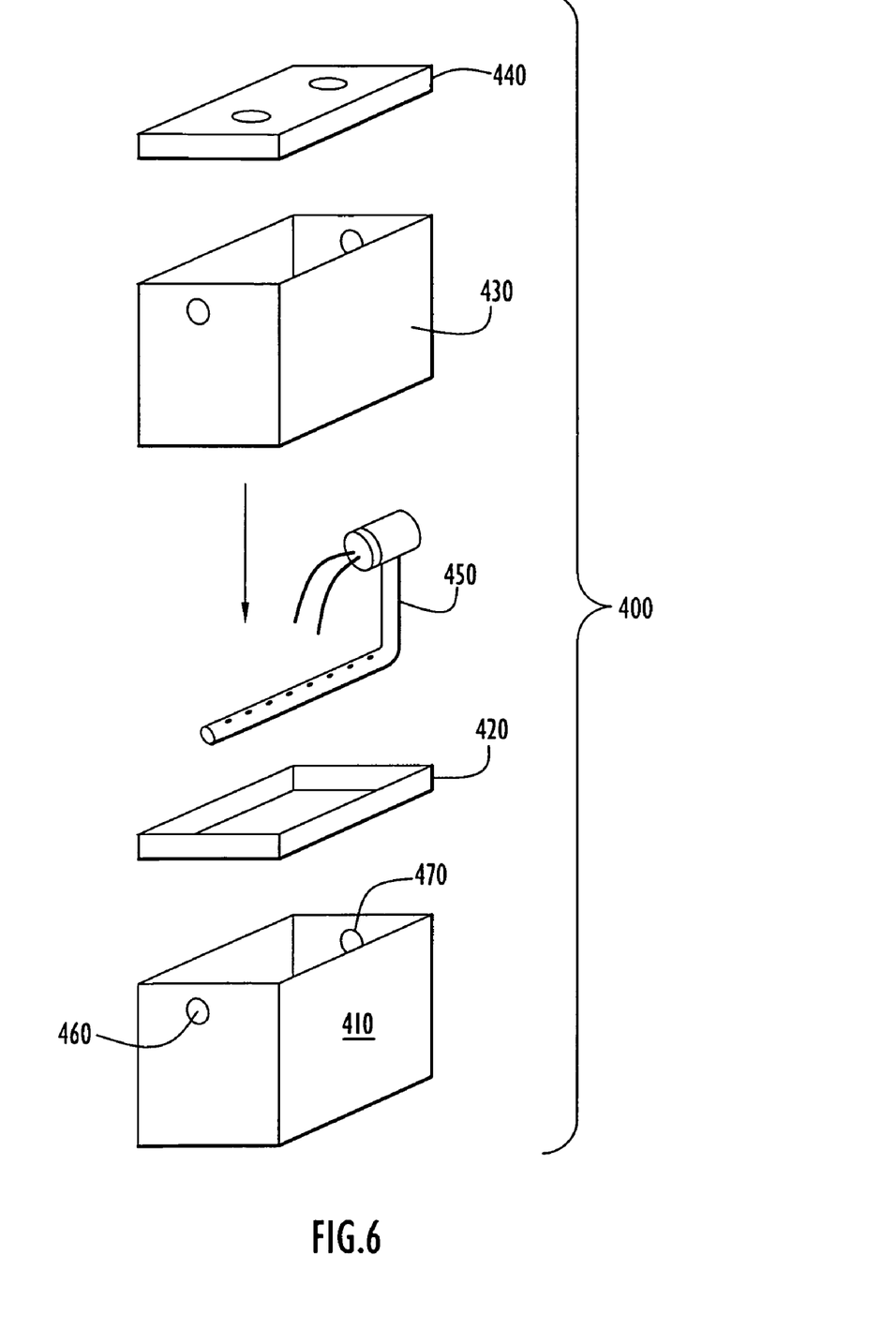
FIG. 6 is an exploded perspective view of a housing according to an embodiment of the invention.

In a preferred embodiment, the housing 400 stores a power source such as a battery pack. The phrase "battery pack" is intended to include a single battery or a plurality of batteries connected in series or in parallel, wherein the single or plurality possesses a variety of voltage capabilities. FIG. 6 illustrates an exploded view of a housing 400 configured to store a battery pack according to an embodiment of the invention. As shown, the housing 400 includes a shell 410 that defines the exterior surface (the perimeter) of the housing 400. When internally mounted, the shell 410 (and thus the housing 400) is contoured to complement the shape of the receptacle 175. A liner, including of a bottom liner 420 and a side wall liner 430, may be applied to the interior of the shell 410 to prevent battery acids (caused by battery out-gassing) from destroying the shell. By way of example, the liner 420, 430 may be formed from material including, but not limited to, polypropylene. The housing 400 (and any of its components) may further comprise a lid 440 and a manifold 450, both discussed in greater detail below. As noted above, the housing 400 may be formed from lightweight material such as aluminum. Alternatively, it may be formed from other lightweight materials, including those resistant to corrosion, e.g., plastic (polypropylene), etc.

The housing 400 (and specifically the shell 410) may further include one or more fluid ports to permit the flow of fluid (air, gases, and/or water) into and/or out of the housing 400. Specifically, the housing 400 may include an exhaust port 460 and an inlet port 470 that permits the flow of air through the housing 400, as well as the flow of water out of the housing. The exhaust port 460 may be disposed along the front wall of the shell 410 (i.e., the wall facing the fore of the pontoon 110 and watercraft 10) and the inlet port 470 may be disposed along the rear wall of the shell 410 such that it is generally aligned with the exhaust port 440. The ports, however, are not limited to this orientation. Positioning the inlet port 470 such that it faces the rear of the pontoon 110 and the exhaust port 460 such that it faces the front of the pontoon 110 shell takes advantage of the convection currents existing within the housing 400 when the watercraft 10 is in motion. The ports may include, but are not limited to, one way valves. The inlet port 470 may be in communication with a ventilation system, as described below. The ports 460, 470 may be lined with a fitting formed from polyvinyl chloride (PVC) (not shown). The dimensions of the ports, while not limited to any particular diameter, is preferably about one to about two inches in diameter.

The dimensions and shape of the housing 400 (e.g., of the shell 410) may vary based on the dimensions of the battery packs and the number of pontoons 110 available. In general, the dimensions of the housing 400 may be calculated by determining the space required to house the battery pack and cables, as well as provide space to accommodate airflow over the top of the battery pack. Generally, about two inches of space above the battery posts/cables is sufficient. In a preferred embodiment, the housing 400 may comprise a rectangular block having a length of about 25 inches, a width of about 15 inches, and a height of about 20 inches. If smaller battery packs are used, a smaller housing 400 may be provided, or the batteries may be secured within the housing 400 utilizing, e.g., lightweight blocks, expanding (chemically inert) foam, etc.

Figure 7:
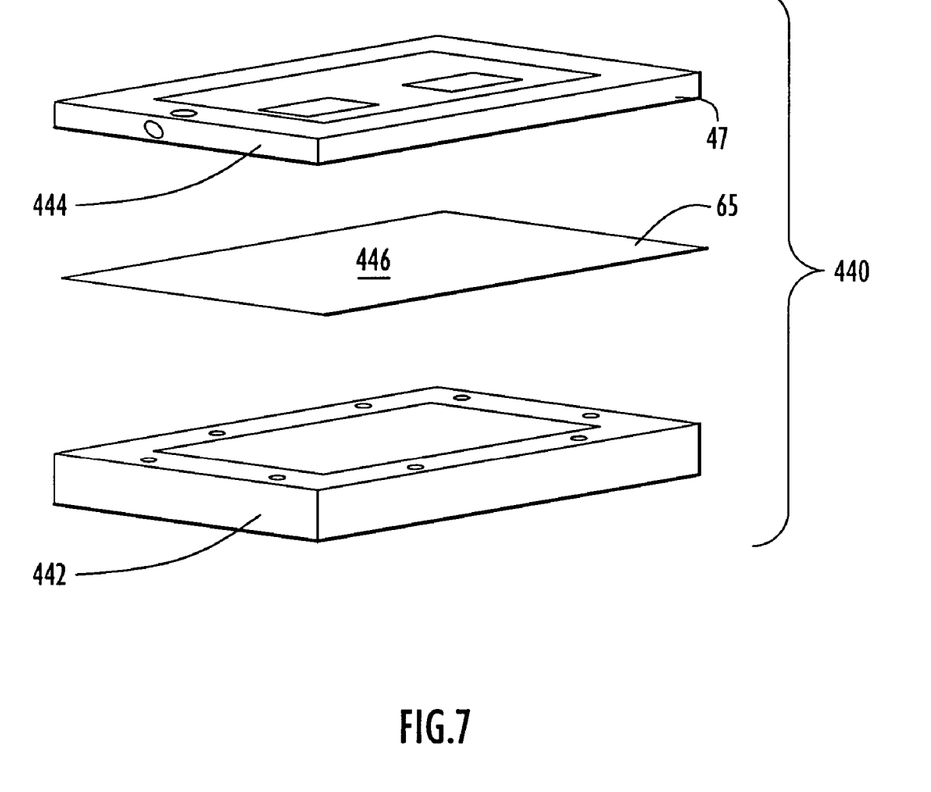
FIG. 7 is an exploded, perspective view of a removable lid for the housing of FIG. 6.

Within the housing 400, the battery packs may be positioned to enable a user to easily access the batteries from the deck 310 by simply removing/opening the corresponding portion of the deck (i.e., the lid 440 of the housing). As discussed above, the housing 400 may comprise a lid 440 that couples to the shell 410 to permit a user to selectively open the housing to gain access to the batteries from the deck 310 of the watercraft 10. FIG. 7 is an exploded view of the lid 440 illustrated in FIG. 6. As shown, the lid 440 includes a frame 442 comprising a lipped structure that engages the shell 410. The dimensions of the frame 442 are not limited and are generally contoured to complement the shape of the shell 410. The top portion 444 of the lid 440, which connects to the frame 442, is typically configured to be flush with the deck 310 of the watercraft 10. As a result, it is preferably formed from material comprising the deck 310 (the deck is discussed in greater detail below). The thickness of top portion 444 may be, but is not limited to, about ¾ inch. A non-reactive liner 446 may be applied to the underside of lid 440. The lid 440 may further include a fluid port to permit the outgassing. The lid 440 may be pivotally or removably coupled to the shell 410 such that a substantially water tight seal is formed when the lid is closed. The housing 400, moreover, may comprise a locking mechanism that secures the lid 440 to the shell 410 for safekeeping the contents of the housing 400 and preventing unauthorized access.

The battery pack stored in the housing 400 may comprise any power source conventionally used to power watercrafts. By way of example, the battery pack may comprise a lead-acid battery having multiple volt configurations (e.g., 6, 12, 24, 36, 48, and 60 volt configurations). The amount of voltage must be sufficient to propel a craft of a given size. Generally, increasing the voltage increases the horsepower obtainable from an electric motor. In a preferred embodiment, eight 6-volt batteries are configured to provide about 48 volts. In a particularly preferred embodiment, eight 6-volt Trojan® 16HC 395 amp lead-acid batteries are used. These batteries possess an approximate weight of 968 lbs.

To provide an electric watercraft that travels faster or farther, it is necessary to manipulate the size, weight, and location of the battery pack. Due to battery construction materials, batteries, for their size, are very heavy. In order to provide an electric watercraft with sufficient power, it is necessary to provide a large battery pack. To compensate for this size, battery packs have traditionally been placed on the deck of a watercraft. Doing so provides ample space for large packs; however, this creates a craft having a high center of gravity, which affects the trim (equilibrium) of the craft. The trim of the watercraft is also affected by the number and location of passengers on board. Passengers typically sit near the front of the craft while it is in motion, creating a fore-oriented (front-oriented) trim. This trim imbalance increases the likelihood that the front of the craft will submarine during use, as well as the likelihood that the front of the ship will plow water (instead of cutting through it). When either occurs, increased drag results. Increased drag, in turn, results in an additional drain on battery resources.

Since the weight of the battery packs are positioned lower than the deck surface, the above described mounting configurations provide the watercraft 10 with a lower center of gravity than that provided in water vehicles where the battery pack is set on the deck. This creates a more stable trim (ship balance) and permits the use of even larger battery sizes. In addition, the internal or external mounting configurations can be utilized to provide the watercraft 10 with an aft-oriented trim. Specifically, an aft-oriented trim may be created by placing more than 50% of the total weight of a battery pack proximate the aft section of the pontoon 110 (i.e., the portion of the pontoon lying aft of a pontoon flotation centerline 150). The exact placement of the housing 400, and thus the battery weight, depends upon the desired degree of listing, as well as the location and weight of peripheral materials (e.g., furniture) located on the deck 310 of the watercraft 10. By way of specific example, when the housing is rectangular, 40% of the housing length is placed forward of the flotation centerline 150 and 60% of the housing length is placed rear of the centerline. Thus, in an embodiment where the housing 400 is 25 feet in length, 10 feet of the length should lie forward of the centerline, and 15 feet should lay aft of the centerline.

Mounting the housing 400 on the pontoon 110 such that the majority of the weight of a battery pack is aft oriented causes the watercraft 10 to list (tilt or pitch) to the rear. This improves the energy efficiency of the craft by minimizing the effect of water forces. That is, when the watercraft 10 is in motion, rear listing improves the stability of the craft because the rear of the craft is more submerged than the front. At typical speeds (less than about 10 miles per hour), pontoon water vehicles do not plane above water. This increases the risk of submarining and plowing. In addition, when the internal mounting configuration is used, the center of gravity is lowered, increasing the stability of the craft. Increasing stability and reducing the effect of water forces on the watercraft improve battery performance since the batteries do not have to supply energy to compensate for these disturbances. The aft-oriented trim design as well as the internal mounting configurations are marked improvements over the prior art for it uses the weight of the battery pack address these problems.

In addition, aft orientation improves the convection currents of both the housing ventilation system (discussed below) and the canopy ventilation systems (when present). The watercraft 10 may be further stabilized by distributing the weight of the battery packs evenly among the pontoons 110. Thus, when more than one pontoon 110 is present, each pontoon is preferably aft-oriented. Placing batteries on only one side of a watercraft 10 (e.g., the port or starboard side) destabilizes the trim of the craft. Thus, when the watercraft 10 is subjected to side-rolling waves (i.e., waves approaching from the right or the left), rollover is possible. Dividing the weight of the batteries evenly among pontoons 110 provides a watercraft 10 with a more stable transverse trim.

Figure 8:
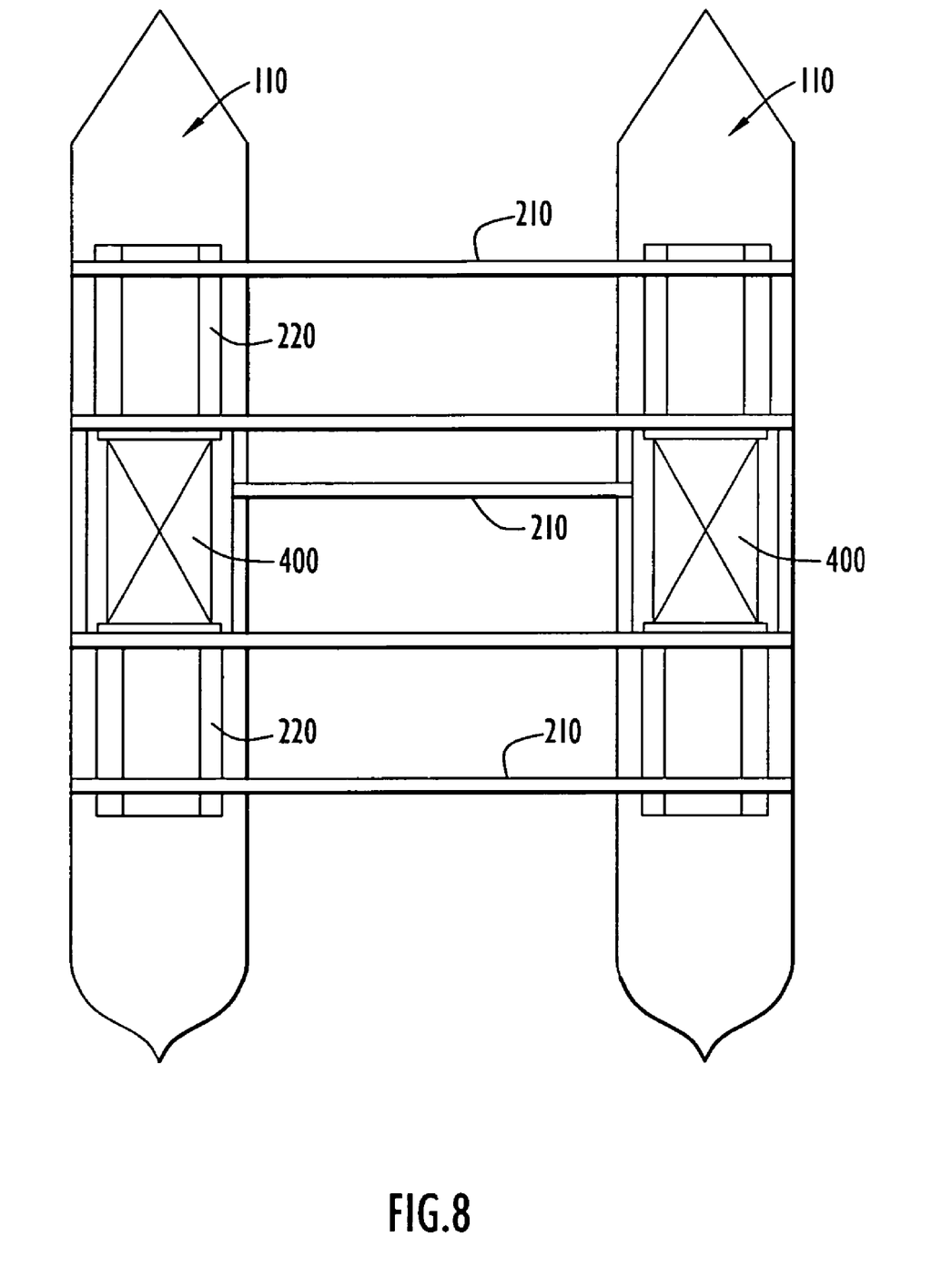
FIG. 8 is a top plan view of the watercraft of FIG. 1, with the deck section removed for clarity.

Referring again to FIG. 1, the strut section 200 of the watercraft 10 couples the pontoon section 100 to the deck section 300. The strut section 200 may comprise, but is not limited to, support devices such as joists, brackets, etc. FIG. 8 illustrates a top plan view of the watercraft of FIG. 1 with the deck section 300 removed for clarity. As shown, the strut section 200 includes joists 210 connected to the pontoon section 100 via brackets 220. It is important to note that the brackets and joists are positioned to provide ample space for the placement of housing 400. The joist 210 may comprise a C-joist and, in particular, a plurality of three-inch C-joists running the width of the watercraft 10 and are spaced about 16 inches apart. The bracket 220 may comprise an M-bracket. In particular, M-brackets having a length of about 24 inches are preferred. The number of joists 210 and brackets 220 required depends on the length of the pontoons 110 and/or the deck 310.

As noted above, the deck section 300 includes a deck 310 and, optionally, a canopy 320. The deck section 300 includes a structure configured to support passengers and other components of the watercraft 10 above the pontoon section 100. The composition or thickness of the deck 310 is not particularly limited, and may comprise any material sufficient to support the desired passenger or cargo weight. The deck 310, for example, may be formed from materials including, but not limited to, wood, metal, plastic, fiberglass, etc. A preferred example is plywood having a thickness of about ¾ inch. The deck 310 may comprise any length and width 310 suitable for its described function. The deck dimensions are typically adjusted to accommodate various load and passenger amounts. For example, the deck 310 may have a length of about 20-25 feet and a width of about 8 feet. The deck 310 may also contain ornamental graphics or a covering (e.g., waterproof coverings, rubberized coverings, carpet, etc.).

The optional canopy 320, supported above the deck 310, may comprise any conventional rigid or soft structure that serves as a weather shield. In addition, the canopy may comprise a solar canopy similar to that disclosed in U.S. patent application Ser. No. 10/601,830, incorporated by reference in its entirety above. Briefly, the disclosed solar canopy comprises a frame, a headliner, solar panels, and a ventilation system that regulates the flow of air within the canopy. The solar canopy transfers solar energy to the battery pack, charging the pack.

As discussed above, the watercraft 10 may further include a ventilation system operable to vent the housing 400 coupled to the pontoon 110. The ventilation system is controlled by a control console 350 located on the deck 310. The console 350 may further be configured to control transferring power from the solar panels the battery pack when a solar canopy is present. Typically, the console 350 houses a charge controller (not shown) and other heat-generating products (e.g., DC to AC converters, fuses, transformers, entertainment devices (stereos) and GPS devices). The type of charge controller is not particularly limited, but preferred is a controller disclosed by U.S. Pat. No. 6,111,391, the entire contents of which are incorporated herein by reference. This charge controller is available from by RV Power Products Inc., Vista, Calif. Since the recharging cycle of the charge controller generates heat, and since heat decreases the efficiency of the controller, removing heat increases the controller's efficiency.

Figure 9:
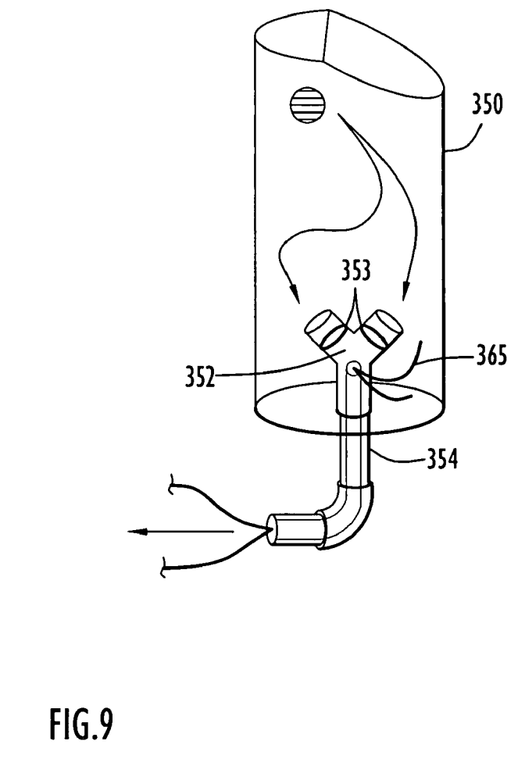
FIG. 9 is a flow diagram of the battery ventilation system including the control console and pontoon housings.

For this reason, the control console 350 may comprise ventilating system. FIG. 9 illustrates a ventilation system of the watercraft 10 according to an embodiment of the invention, showing the control console 350 in communication with the housings 400 and battery packs contained therein. As illustrated, the console 350 may include a fitting 352 (e.g., a Y-shaped fitting) including one or more fans 353. The fitting 352 is connected to a conduit 354 (e.g., a pipe) exiting through the bottom of console 350 (between the bottom of the deck and the top of the pontoon section (not shown)). The conduit 354 delivers airflow to the container. Positive and negative battery wires 365 connecting the entire system to a battery pack also run through the conduit 354. By way of example, if the pontoon section 100 includes two housings 400, the conduit 354 may connect to a splitter pipe 356 that divides the line to deliver air into each housing 400. The divided pipes 358 enter the housing 400 through the inlet port 470 located on each housing 400. As described above, each housing 400 may further include an exhaust port 460 to expel waste air out of the housing 400. The exhaust port 460 may comprise a one-way valve that allows exhaust air to exit, but prevents water from entering the housing 400.

Figure 10:
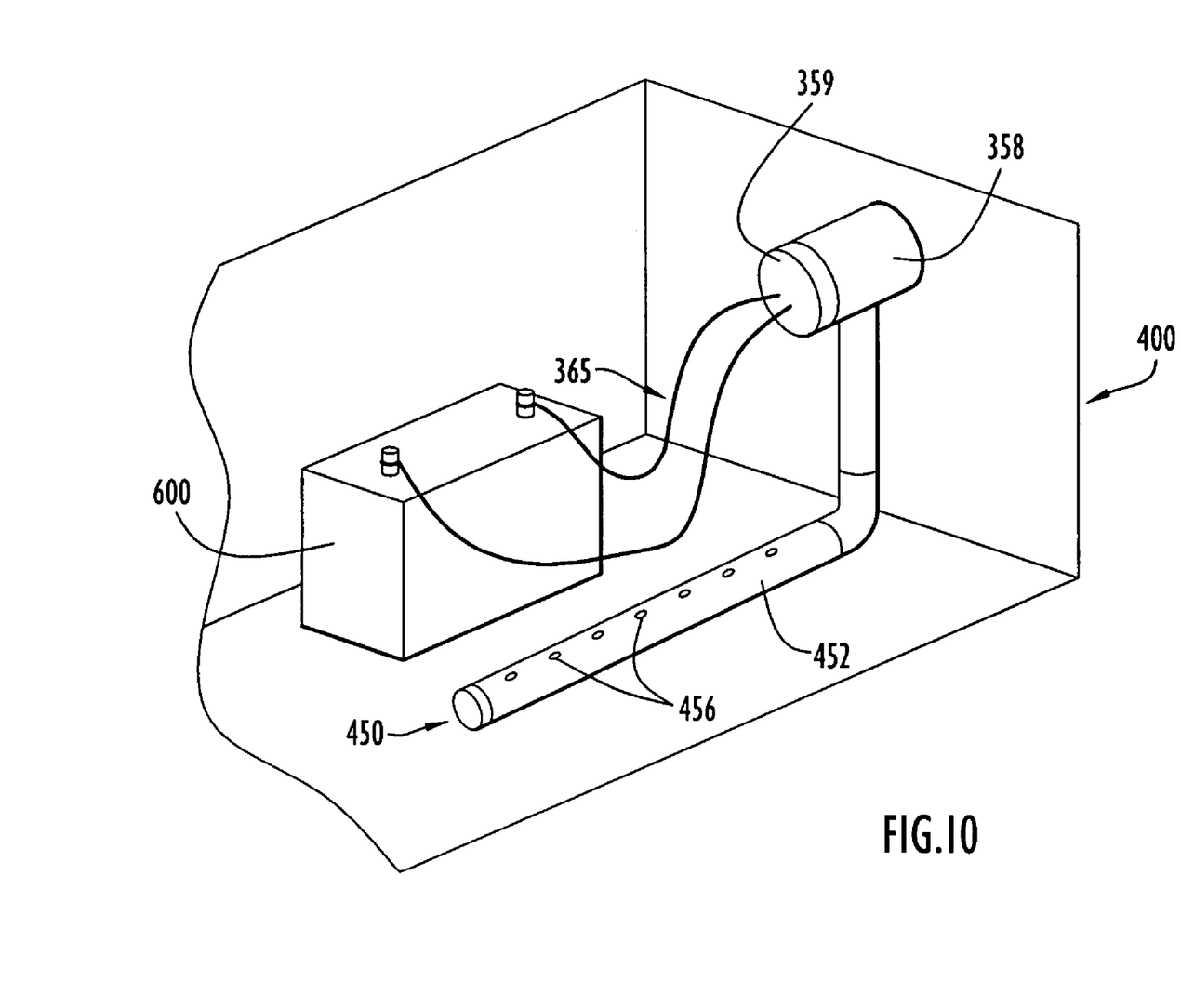
FIG. 10 is an internal view of housing of FIG. 6, showing the housing ventilation.

FIG. 10 shows an interior view of the housing in communication with the ventilation system. In the embodiment illustrated, the ventilation system comprises a manifold 450 connected to the splitter pipe 356 extending into the housing 400 via the air inlet port 470. The splitter pipe 358 is capped using a pipe cover 359 so that the air is directed through a manifold pipe 452. The pipe cover 359 contains apertures through which battery wires 365 protrude and connect to a battery pack 600 located in the housing 400. The battery pack 600 may be positioned within the housing 400 in any desired manner. For example, the battery pack 600 may be set on either side of manifold pipe 442, as well as secured above the manifold 450.

The manifold pipe 452 extends down the interior of the housing 400 (e.g., the side containing the inlet port) and along the floor. The manifold pipe 452 comprises openings 454 directed toward the lid 440 of the housing 400 to direct airflow upward. The end of the manifold pipe 452 is closed at its terminal end to force the air through openings 454. The piping may be formed from any material, including corrosion resistant material such as chlorinated polyvinyl chloride (CPVC). The dimensions of the piping are not limited, with the conduit 354 or the splitter pipe 356 having a preferred diameter of about two inches, and the manifold pipe 452 having a preferred diameter of about ⅜ inch.

The operation of the power/ventilation system is explained with reference to FIGS. 9 and 10. When activated (e.g., by a thermostatic switch), the fans 353 draw cooler, outside air into control console 350. As indicated by the arrows, this cool, dense air pushes the heated air through pipes 354, 358 that empty into each housing 400. Specifically, the air is pushed through manifold pipe 452 and out openings 454. The air then travels over the battery pack (not shown), and exits the front of housing 400 via exhaust port 460. This system creates a more efficient battery-charging environment by not only removing the heated air from control console 350 (thus improving the efficiency of the charge controller), but also reducing the corrosive effect and the explosive potential of any fumes collected in the housing 400 (by pushing the fumes out of the housing 400).

While the invention has been described in detail and with reference to specific embodiments thereof, it will be apparent to one skilled in the art that various changes and modifications can be made therein without departing from the spirit and scope thereof.

For example, the pontoon and housing structure, while advantageously used in a watercraft 10 including an electrical motor (requiring a large power source), may be used in a watercraft that has a gas outboard motor, but uses a battery pack to run peripheral components. Gas-powered crafts would still benefit from the innovative housing/pontoon design, namely, from the improved deck space, battery ventilation, shock risk reduction, and aft-orientation stability advantages. In addition, a gas-powered craft could utilize the solar panel system (when present) as a generator for the craft's electrical power system.

The partially inset battery location provides for the storage of large battery banks that are serviceable from the deck, as well the isolates the corrosive effects of batteries to an area separate from the pontoon structure.

The housing 440 and pontoon 110 may be formed as separate components and then integrated via assembly, or may be formed as one integral unit (e.g., via molding).

The motor for the watercraft 10 can be any of many known in the art. For example, it may comprise an electric outboard, a gas outboard, or a trolling motor. The size of the motor depends on the size of the watercraft. Preferably, the motor provides at least about 90 lbs of thrust power. The preferred motor is an electric outboard. A particularly preferred electric outboard provides a minimum horsepower rating of about four.

The object stored by the housing 400 is not particularly limited, and may include objects other than battery packs. For example, the housing 400 may be configured to as below deck storage to store personal items (food), to store fishing bait, and to serve as a live well (for fish, crabs, etc.), In addition the housing 400 may be configured to store other power sources and watercraft components. By way of specific example, the housing 400 may house cold storage devices such as refrigerators and/or other cooling systems (since water will cool the pontoon 110 and housing 400 as the watercraft 10 travels along its surface).

The power system of the present invention may be "inverter-capable"; that is, it can power various appliances such as remote tents, campsites or cabins, television sets, refrigerators, power tools, lamps, etc.

The advantages of the housing and pontoon structure are numerous. The structure not only provides a secure location for high current batteries; but also provides a mechanism by which batteries are placed within pontoons. The heavy weight of a battery, once a disadvantage, can advantageously be used to lower a watercraft's center of gravity and increase its stability which, in turn, permits the use of additional battery weight. The use of increased battery weight provides systems having greater horsepower and sufficient energy for a full day's boating activity, as well as systems that are inverter capable. The housing ventilation, one way exhaust, and support plate assembly can be inserted as an individual component into other manufacturers' pontoon boats, or can be made integral with various-sized pontoons, providing manufacturers with an efficient production method for offering electric storage capacity without altering their production boat styles. The housing ventilation can be used as a pre-manufactured live well, accessible from the deck as well as from a secured storage area. The housing and ventilation assembly can also be used as a secured storage area for personal objects. Placing of the battery below the deck provides designers and passengers with full use of the deck. The use of an electric outboard motor in combination with a lower center of gravity permits the use of a steering wheel instead of a tiller. Thus, the watercraft 10 of the present invention is generally maintenance free, cost effective, and capable of providing quiet cruising. Since the craft may be configured to be fully electric, it eliminates delays due to low gasoline or poor fuel mix. The invention also eliminates the inconveniences of smell of fuel on hands, grease/oil on clothing, and the need to annually winterize the craft.

When solar panels are present, the battery pack is continuously recharged, thus avoiding the inconvenience of delays caused by a dead battery, and negates the need for public utility AC current and electric cords, which frees the user from reliance of recharging only where adequate AC power is available. Battery longevity is increased because the electricity is available to charge the controller during sunlight hours. In addition, it lessens the risk of electrocution not only because the power system eliminates the need to connect to an electric charger while on the water, but also because the battery location minimizes the risk of passenger contact with the battery pack.

Thus, it is intended that the present invention covers the modifications and variations of this invention that come within the scope of the appended claims and their equivalents. For example, it is to be understood that terms such as "top", "bottom", "front", "rear", "side", "height", "length", "width", "upper", "lower", "interior", "exterior", "inner", "outer" and the like as may be used herein, merely describe points of reference and do not limit the present invention to any particular orientation or configuration.

I claim:

1. A pontoon for a watercraft comprising:
a body including a forward section comprising a terminal end, an intermediate section comprising a flotation centerline, and an aft section comprising a terminal end; and
a housing coupled to the pontoon, the housing operable to house a battery pack therein and permit a user to selectively access the battery pack, wherein the housing comprises at least one fluid port.

2. The pontoon of claim 1, wherein housing is mounted on the exterior surface of the pontoon.

3. The pontoon of claim 1, wherein the pontoon comprises a receptacle and the housing is disposed at least partially within the receptacle.

4. The pontoon of claim 3, wherein the receptacle comprises a recess formed in the pontoon body.

5. The pontoon of claim 3, wherein the receptacle comprises an opening permitting the passage of the housing at least partially into the pontoon.

6. The pontoon of claim 5 further comprising a plate disposed within the interior of the pontoon, wherein the plate is operable to support the container.

7. The pontoon of claim 6, wherein the housing is oriented on the support plate such that it extends from the support plate to the exterior of the pontoon body.

8. The pontoon of claim 1, wherein the housing is located proximate the flotation centerline of either the pontoon or the watercraft.

9. The pontoon of claim 1, wherein the at least one fluid port comprises an air inlet port and an air outlet port.

10. A watercraft comprising:
a craft body including a deck; and
a pontoon suspended below the deck comprising
a body, and
a housing coupled to the pontoon body operable to house an object therein, wherein the housing permits selective access to the object via the deck, and wherein the deck comprises an aperture configure to receive a portion of the housing.

11. The watercraft of claim 10, wherein the housing is mounted on the exterior surface of the pontoon.

12. The watercraft of claim 10, wherein the housing extends partially into the pontoon.

13. The watercraft of claim 10, wherein:
the pontoon comprises a body including a top wall, a bottom wall, a first side wall, and a second side wall, the walls defining an enclosed channel; and
the housing intersects both the top wall of the pontoon and the deck.

14. The pontoon of claim 10, wherein the pontoon comprises a receptacle and the housing is mounted at least partially within the receptacle.

15. The pontoon of claim 14, wherein the receptacle comprises a recess formed in the pontoon body.

16. The watercraft of claim 15, wherein the deck further includes an aperture configured to receive a portion of the housing, and the housing extends from the recess to the deck aperture such that a top end of the housing is substantially flush with the deck.

17. The pontoon of claim 14, wherein, wherein the receptacle comprises an aperture permitting the passage of the housing therethrough.

18. The watercraft of claim 17, wherein the deck further includes an aperture configured to receive a portion of the housing, and the housing extends from the pontoon, through the opening, and into the deck aperture such that a top end of the housing is substantially flush with the deck.

19. A method of forming a pontoon comprising:
(a) forming a pontoon body including a forward section comprising a terminal end, an intermediate section comprising a flotation centerline, and an aft section comprising a terminal end; and
(b) coupling a housing operable to house a battery pack to the pontoon body, wherein the housing comprises at least one fluid port, and wherein the housing permits a user to selectively access the battery pack.

20. A watercraft comprising:

a craft body including a deck; and a pontoon suspended below the comprising:

a body including a top wall a bottom wall, a first side wall, and a second side wall, the walls defining an enclosed channel, and a housing coupled to the body operable to the house an object therein, the housing permitting selective access to the object via the deck, wherein the housing interest both the top wall of the pontoon and the deck.

* * * * *

UNITED STATES PATENT AND TRADEMARK OFFICE
CERTIFICATE OF CORRECTION

PATENT NO. : 7,263,945 B2  Page 1 of 1
APPLICATION NO. : 11/356458
DATED : September 4, 2007
INVENTOR(S) : Rolland N. Little It is certified that error appears in the above-identified patent and that said Letters Patent is hereby corrected as shown below:

In the Claims

Column 12, line 55, delete "configure" and replace with -- configured --.

Column 14, line 10, after "the" insert -- deck --.

Column 14, line 11, after "wall" (first occurrence), insert -- , --.

Column 14, line 18, delete "interest" and replace with -- intersects --.

Signed and Sealed this
Fifth Day of August, 2014

Michelle K. Lee
*Deputy Director of the United States Patent and Trademark Office*